(12) United States Patent
Fisher

(10) Patent No.: US 11,466,796 B2
(45) Date of Patent: Oct. 11, 2022

(54) PIPE CLAMP

(71) Applicant: David Fisher, Catoosa, OK (US)

(72) Inventor: David Fisher, Catoosa, OK (US)

( * ) Notice: Subject to any disclaimer, the term of this patent is extended or adjusted under 35 U.S.C. 154(b) by 111 days.

(21) Appl. No.: 15/823,538

(22) Filed: Nov. 27, 2017

(65) Prior Publication Data

US 2019/0162332 A1 May 30, 2019

(51) Int. Cl.
| | |
|---|---|
| F16L 3/08 | (2006.01) |
| F16L 3/11 | (2006.01) |
| F16L 3/12 | (2006.01) |
| F16L 3/22 | (2006.01) |

(52) U.S. Cl.
CPC . *F16L 3/11* (2013.01); *F16L 3/12* (2013.01); *F16L 3/222* (2013.01); *F16L 3/08* (2013.01)

(58) Field of Classification Search
USPC ............... 248/65, 67.7, 74.2, 230.6, 231.71
See application file for complete search history.

(56) References Cited

U.S. PATENT DOCUMENTS

| | | | |
|---|---|---|---|
| 2,913,203 A | 11/1959 | Bertling | |
| 3,185,418 A | 5/1965 | Appleton | |
| 3,526,381 A | 9/1970 | Pepe | |
| 3,539,138 A | 11/1970 | Desroches | |
| 4,479,625 A | 10/1984 | Martz | |
| 5,121,894 A * | 6/1992 | Twork, Sr. | F16L 3/13 248/316.7 |
| 5,141,186 A * | 8/1992 | Cusic | F16L 3/24 24/279 |
| 5,284,110 A * | 2/1994 | Hostetler | A01K 39/0213 119/72 |
| 6,572,057 B1 * | 6/2003 | Roth | F16L 3/24 248/217.2 |
| 7,097,142 B1 | 8/2006 | Schmidt | |
| 7,429,020 B2 | 9/2008 | Heubner et al. | |
| 7,931,242 B2 | 4/2011 | Tjerrild | |
| 7,992,829 B1 * | 8/2011 | Baker | F16L 3/24 248/62 |
| 8,220,757 B2 | 7/2012 | Gardner | |
| 8,439,316 B2 * | 5/2013 | Feige | F16L 3/10 248/71 |
| 8,464,985 B2 | 6/2013 | Mulch et al. | |
| 8,544,802 B2 | 10/2013 | Bigham | |
| 8,602,798 B2 | 12/2013 | Downing | |
| 8,662,455 B2 * | 3/2014 | Hernandez | F16B 2/245 248/222.12 |
| 9,243,723 B2 * | 1/2016 | DeCesare | F16L 3/123 |
| 2012/0025034 A1 * | 2/2012 | Turner | F16L 3/04 248/65 |
| 2017/0108145 A1 | 4/2017 | Alquier et al. | |

* cited by examiner

*Primary Examiner* — Alfred J Wujciak

(74) *Attorney, Agent, or Firm* — Margaret Millikin

(57) ABSTRACT

A method and apparatus for installing pipes. The apparatus is a clamp for hanging or supporting pipe. The clamp comprises a base and a seat for receiving a pipe. The seat comprises at least two load bearing members adapted to receive the pipe. The clamp further comprises at least two side support members extending upward from the base at an oblique angle with respect to the base. The two support members each comprise an upwardly extending arm for receiving the pipe and wherein each upwardly extending arm forms an aperture for receiving a fastener to secure the pipe within the clamp. The clamp preferably comprises an integral, one-piece unit. Methods of making a pipe clamp and installing a pipe also are disclosed.

9 Claims, 6 Drawing Sheets

PIPE CLAMP

TECHNICAL FIELD OF THE INVENTION

The present invention relates generally to clamps, hangers and brackets for hanging or supporting electrical and mechanical pipes, and more particularly, but not by way of limitation, to clamps for hanging or supporting electrical conduits in industrial applications. Methods of installing, hanging and supporting pipes in industrial settings also are provided. Methods of making a pipe hanger also are provided.

SUMMARY OF THE INVENTION

The present invention is directed to a clamp for supporting pipes. The clamp comprises a base having a first end and a second end; and a seat for receiving a pipe. The seat comprises a load bearing member adapted to receive the pipe and contiguous with the base. The clamp comprises at least two side support members adapted to receive the pipe, the at least two side support members extending from the base at an oblique angle with respect to the base, wherein at least one of the two side support extends from the first end of the base and wherein another of the at least two side support members extends from the second end of the base. The clamp is formed from a single piece of material and wherein the load bearing member comprises a bottom and a top and wherein the bottom of the load bearing member is wider than the top of the load bearing member to distribute the weight of the load imparted by the pipe.

The present invention further is directed to a method of installing a pipe horizontally or vertically to a structural support. The method comprises the steps of providing a load bearing member adapted to receive the pipe in either a vertical or horizontal position, the load bearing seat contiguous with a base.

The present invention further is directed to a method of making a clamp for supporting pipes. The method comprises the step of forming an integral cutout from a single material. The cutout comprises a base and a seat for receiving a pipe, the seat comprising a load bearing member adapted to receive the pipe and contiguous with the base, and at least two side support members.

DETAILED DESCRIPTION OF THE INVENTION

In industrial settings, pipe may be installed vertically or horizontally on walls, floors or ceilings and on large equipment and systems. Pipe hangers secure the pipe to the support structure and transfer the load of the pipe to the support structure. The load includes the weight of the pipe, the weight of any materials that the pipe is carrying, and any pipe fittings and coverings, such as coatings or insulation. The load may be significant and strain or stress the pipe hanger causing deformation of the pipe hanger and the enclosed pipe.

Figure 1:
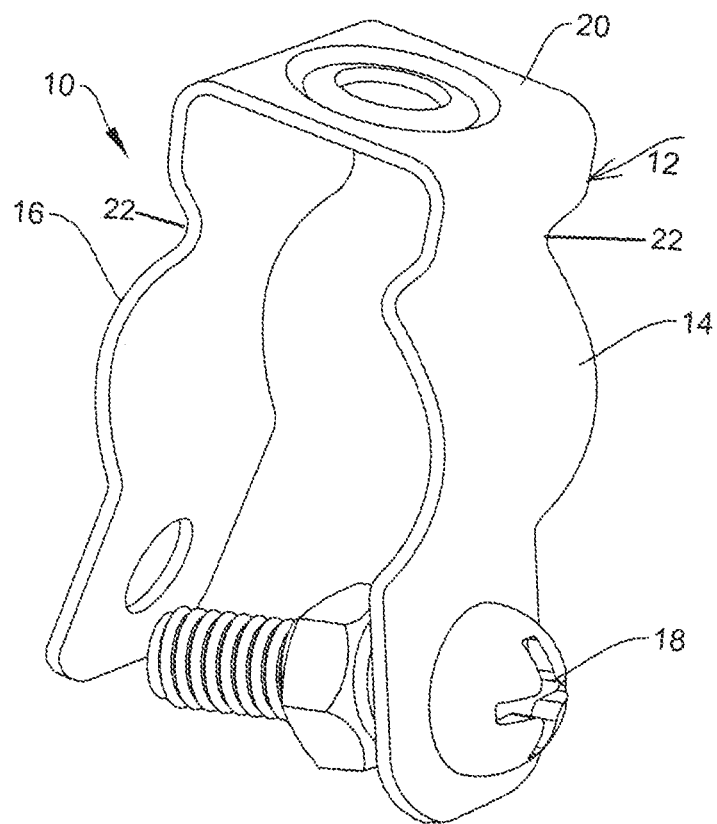
FIG. 1 is a perspective view of a prior art pipe clamp.

As shown in FIG. 1, a conventional pipe hanger 10 comprises a strap 12 that grips the pipe on two sides. The strap forms a U-shape having two curved arms 14 and 16 for gripping the pipe. The ends of the strap 12 are bolted together with bolt 18, enabling the strap to grip a partial circumference of the pipe. The strap comprises a base 20 that is bolted to the wall or other support structure at the opposite end. The curvature of the arms 14 and 16 terminates near the base, forming an indentation 22 in the hanger, which is subject to failure.

When using a conventional pipe hanger to install pipe on a support structure having a vertical orientation, such as a wall or an item of industrial equipment, the pipe is susceptible to moving inside the hanger. This is attributable to weakness of the strap at the point of indentation in the hanger. As the bolt is tightened, joining the two arms of the strap, the indentation near the base begins to bow outwardly, loosening the engagement of the two arms with the pipe that the hanger is holding. The pipe becomes loose within the hanger and is subject to movement, which is of particular concern in electrical applications.

Pipe may be installed on a vertical surface in either a vertical or horizontal orientation. Conventional strap-type pipe hangers lack rigidity and strength and cannot bear direct forces. The lack of rigidity causes the hanger to bend and disengage from the support surface, particularly when hung from a vertical support surface.

Conventional pipe hangers also present weaknesses in horizontal applications, for example, on the floor near a manufacturing system or on horizontal surfaces, such as an industrial conveyor. In horizontal applications, the pipe hanger can be stepped on or objects may be stacked on the hanger, which deforms the hanger and allows the pipe to slip. The lack of rigidity in the pipe hanger also permits the pipe and its contents to be crushed and damaged.

The pipe clamp of the present invention overcomes the weaknesses and failures associated with conventional pipe hangers. As used herein, the term pipe includes conduits, tubes, casings, hoses, ducts, and channels employed particularly, though not exclusively, for use in industrial applications. The pipe clamp of the present invention fully grips the pipe and supports the pipe when installed in either vertical or horizontal configurations on a vertical support surface, and in a horizontal configuration on a floor. The pipe clamp of the present invention comprises a rigid, one-piece clamp and forms a seat for receiving the pipe, thereby enabling the clamp to grip the pipe circumferentially and providing rigidity, toughness and strength to resist slippage and crushing. These and other advantages will be apparent from the description of the embodiments of the invention.

Figure 2:
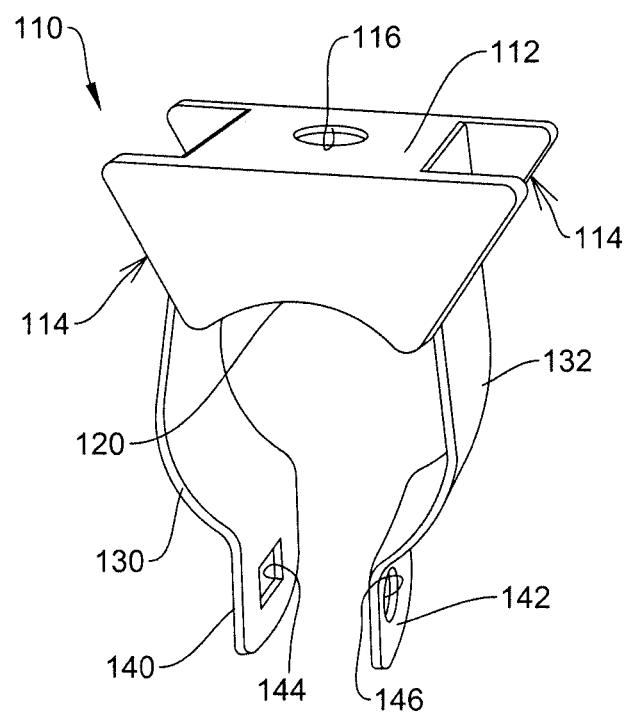
FIG. 2 is a front perspective view of an exemplar of the pipe clamp of the present invention.
Figure 3:
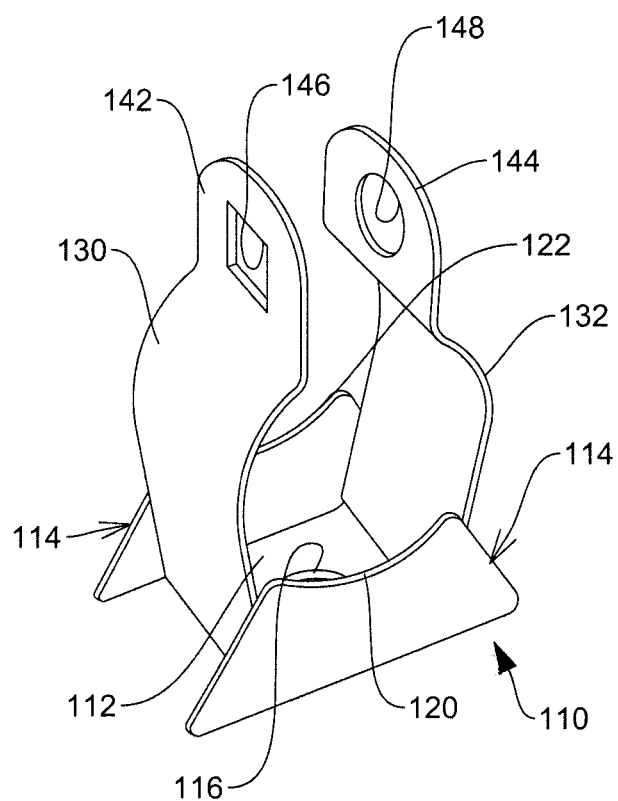
FIG. 3 is a side perspective view of an exemplar of the pipe clamp of the present invention.

Turning now to the drawings in general, and to FIGS. 2 and 3 in particular, there is shown therein a pipe clamp 110 of the present invention. The pipe clamp 110 comprises a base 112 and a seat 114 for receiving a pipe. The base 112 forms one or more apertures 116 for receiving a bolt or other connecting means to secure the pipe clamp 110 to a support surface. It will be appreciated that the base 112 may form multiple apertures for those industrial applications when the pipe is large or heavy and the clamp 110 is larger to accommodate the larger pipe.

The seat 114 extends from the base 112 and is contiguous therewith, to enhance rigidity, strength and support to the clamp 110 and to resist against tensional and torsional forces after installation. The seat 114 comprises a load bearing member adapted to receive the pipe. In one embodiment of the invention, the seat 114 forms two load bearing members 120 and 122 which are integral with and extend from the base 112. Each load bearing member 120 and 122 has bottom portion and a top portion, wherein the bottom portion of each of the load bearing members is wider than the top of each of the load bearing members to distribute the weight of the load created by the pipe 140. In one embodiment of the invention, each load bearing member 120 and 122 forms a saddle-shape for receiving a tubular shaped pipe. It will be appreciated that the load bearing members 120 and 122 may be adapted to receive a pipe of any shape or configuration. It also will be appreciated that the seat 114 may be a single, solid support with one or more apertures 116 drilled therethrough to the base 112, for the purpose of securing the pipe clamp 110 to a support surface.

Figure 4:
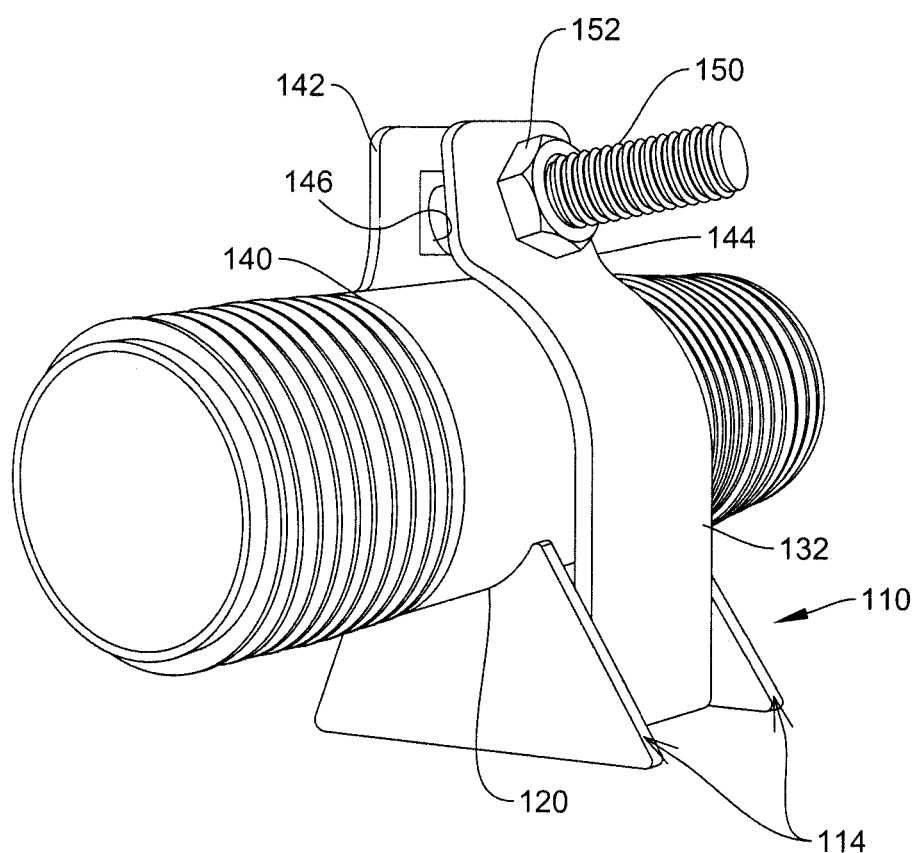
FIG. 4 is an alternative side perspective view of an exemplar of a pipe clamp of the present invention depicting a pipe engaged within the clamp and illustrates the side support members extending from the base at an oblique angle x with respect to the base.
Figure 5:
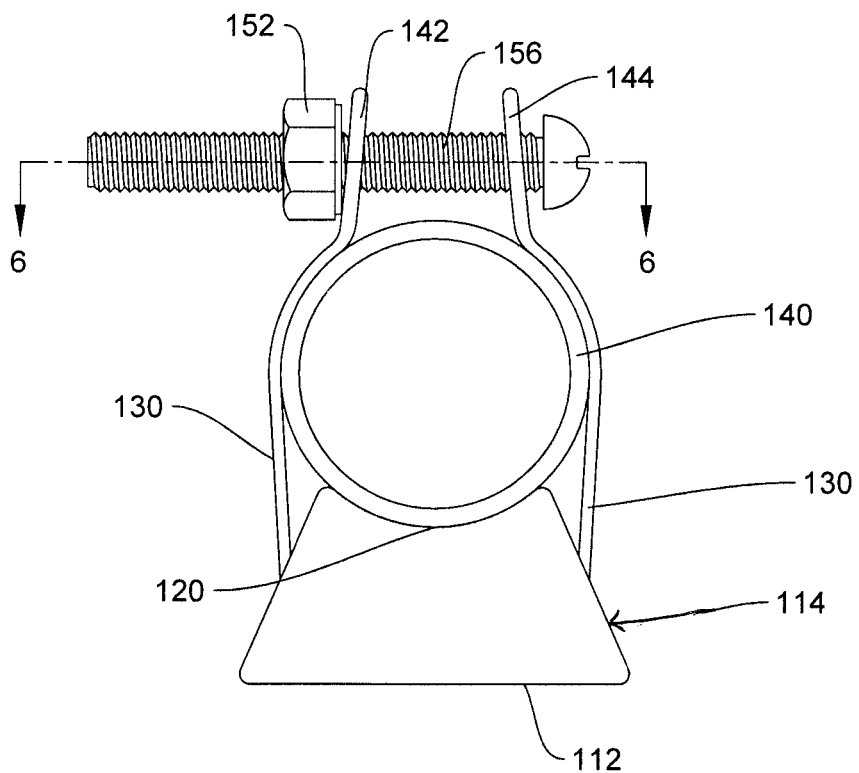
FIG. 5 is a front view of an exemplar of a pipe clamp of the present invention depicting a pipe engaged within the clamp and illustrates the means by which load bearing members support the pipe.
Figure 6:
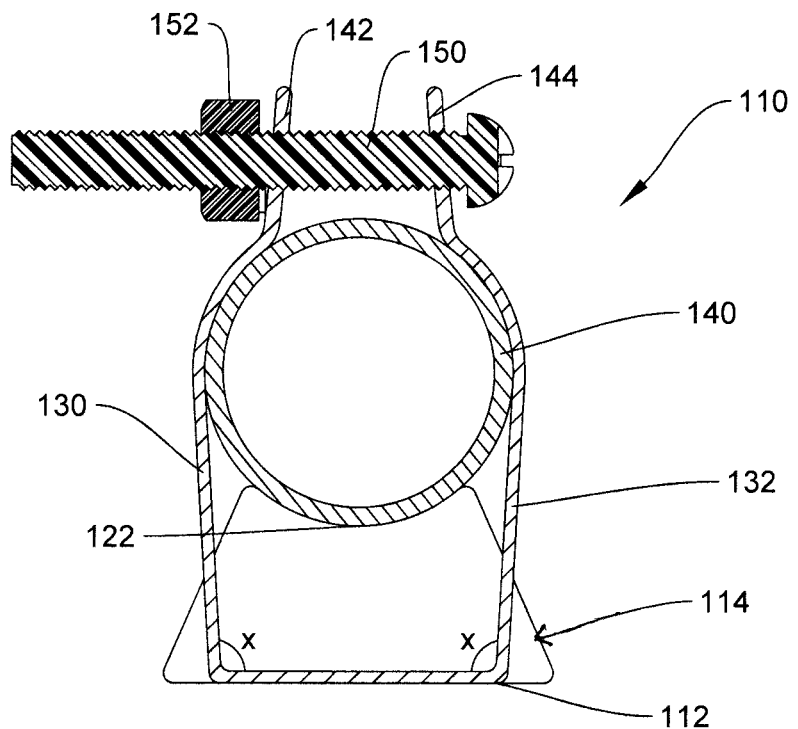
FIG. 6 is a cross-sectional view of the pipe clamp of FIG. 5 taken along line 6-6.

Turning now to FIGS. 4, 5 and 6, but with continuing reference to FIGS. 2 and 3, the pipe clamp 110 further comprises at least two side support members 130 and 132 adapted to receive and grip the pipe. In one embodiment of the invention, the side support members 130 and 132 extend from the base 112 at an oblique angle x with respect to the base, as shown in the cross-section of FIG. 6. The angle x of the side support members 130 and 132 with respect to the base 112 ranges from about 95 to about 155 degrees. The oblique angle of the side support members 130 and 132 serves multiple purposes. For example, the oblique angle x of side support members 130 and 132 of the pipe clamp 110 eliminates the inherently weak indentation 22 of conventional pipe hangers 10, enables the side support members 130 and 132 to begin forming a curvature for receiving, gripping and adapting to the shape of a pipe 140, and pulls tension on the pipe downward directly to the base 112 while simultaneously imparting strength, toughness and rigidity to the side support members and the pipe clamp 110 overall.

At the point where the side support members 130 and 132 begin to engage the pipe 140, the side support members curve to more firmly grip the pipe 140 and terminate in ends 142 and 144. Ends 142 and 144 form apertures 146 and 148, respectively, for receiving bolt 150 and nut 152 or other fastening means.

The side support members 130 and 132 are contiguous with the seat 114 and the base 112. It will be appreciated that the side support members 130 and 132 may extend directly from the seat 114 rather than from the base 112, particularly in those embodiments where the seat 114 is solid. In one embodiment of the invention, the side support members 130 and 132 are integral with the base 112 and the seat 114 in a manner yet to be described. The base 112 and the seat 114 create a levered support for the pipe 140 when the pipe clamp 110 is installed on a structural support.

The pipe clamp 110 may be made of any suitable material imparting sufficient strength, toughness and rigidity for tensional and torsional forces, stress, strain and compression. Some materials suitable for use in constructing the clamp 110 of the present invention include chrome, galvanized steel, steel chrome-plated, steel with nickel/silicon carbide composite coating, brass, brass-chrome plated, zinc plated steel, brass with nickel/silicon carbide composite, stainless steel, stainless chrome-plated, stainless with nickel/silicon carbide composite coating, carbonitrided steel, nickel carbide plated steel, tempered steel, copper coated steel, aluminum, polymers, including polyvinylchloride, polyurethane, polyamide and polyesters, enhanced with glass or carbon composites, and alloys and mixture of the foregoing. Metal materials may be hot-rolled, pickled or oiled plates, strip or coil. It will be appreciated that the clamp 110 may be produced from other materials suited to the particular temperatures, pressures, contents, fluids, applications and other conditions at the site where installed.

Figure 7:
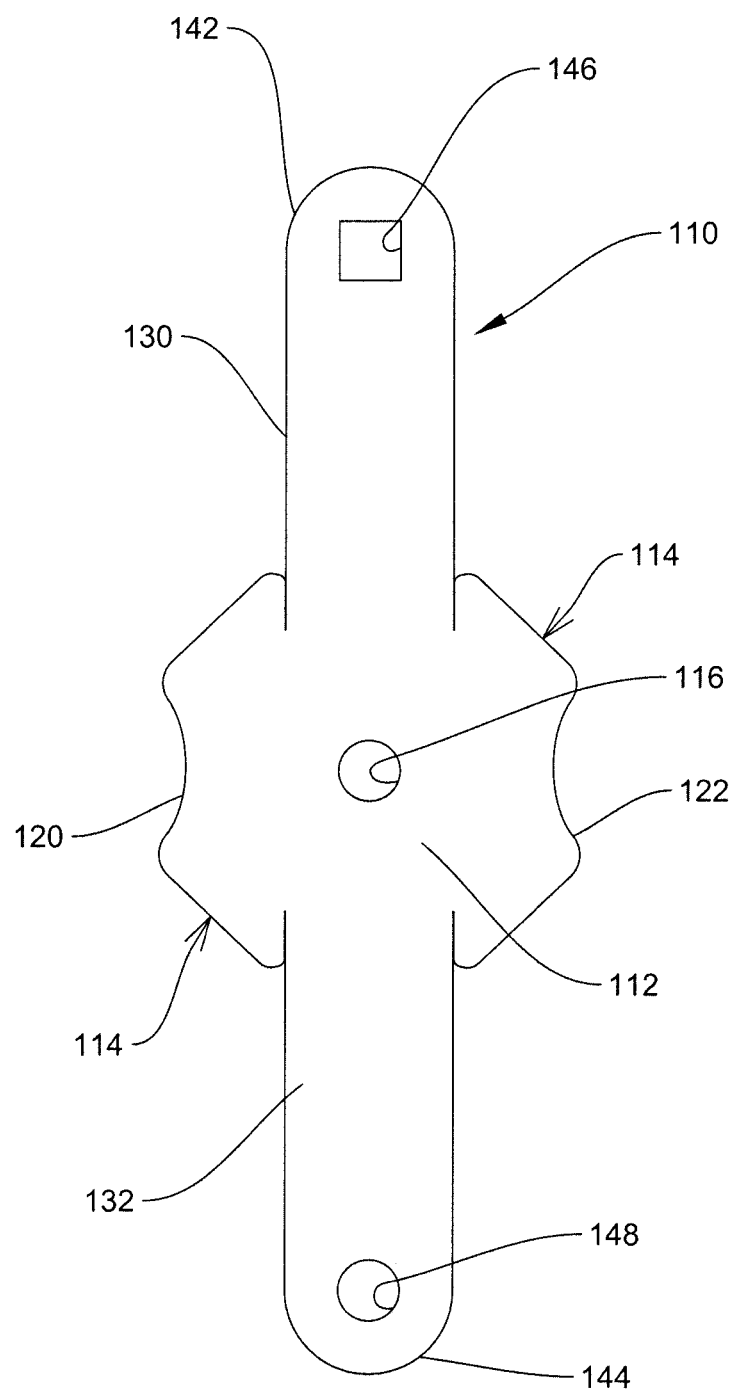
FIG. 7 is a plan view of a cutout pattern for forming an exemplar of the pipe clamp of the present invention.

Turning now to FIG. 7, it will now be appreciated that the clamp 110 may comprise an integral, one-piece unit, which imparts strength, toughness and rigidity and resists tensional and torsional forces. As shown in FIG. 7, a one-piece pattern is die cut or punch-pressed from suitable metal material made from hot-rolled, pickled and oiled steel plates, strip or coil. The pattern includes the various components of the pipe clamp 110 in one integral piece, thus eliminating the need for welds, joints or other securing means between the components. Welds and joints are susceptible to failure, resulting in weakness in the pipe clamp 110. The integral one-piece unit creates an inherently stronger pipe clamp 110. The clamp 110 pattern is formed on a press or other machine to conform to the pattern via rolling, extruding, die forming, forging, indenting, folding, recessing and other processes known in the art for forming metal objects. When the material of the pipe clamp 110 is a non-metal, then molding, casting, extruding and other processes known in the art for forming plastics may be employed.

The dimensions of the pipe clamp 110 are variable and depend upon the application. In one embodiment of the invention, the dimensions of the pipe clamp 110 range as follows:

TABLE 1

| Component | Dimensions (inches) |
|---|---|
| Height of load bearing members 120 and 122 | From about 0.5 to about 2 |
| Width of bottom portion of load bearing members 120 and 122 | From about 1.125 to about 7.5 |
| Width of the top portion of load bearing members 120 and 122 | From about 0.5 to about 5 |
| Radius where pipe 140 is received as measured to seat 114, forming load bearing members 120 and 122 | From about 0.25 to about 6.5 (radius would fit a tubular pipe having a diameter of 0.5 to 6.5 inches) |
| Thickness of load bearing members 120 and 122 | From about 0.03125 to about 3.03125 |
| Width of side support members 130 and 132 | From about 0.75 to about 1.75 |
| Thickness of side support members 130 and 132 | From about 0.03125 to about 3.09375 |
| Radius where pipe 140 is received as measured to side support members 130 and 132 | From about 0.25 to about 6.5 (radius would fit a tubular pipe having a diameter of 0.5 to 6.5 inches) |
| Height of side support members 130 and 132 | From about 0.5 to about 6.5 |
| Height of ends 142 and 144 | From about 0.75 to about 1 |
| Width of ends 142 and 144 | From about 0.75 to about 1.75 |
| Thickness of ends 142 and 144 | From about 0.03125 to about 3.09375 |

TABLE 1-continued

| Component | Dimensions (inches) |
|---|---|
| Diameter or height and width of apertures 146 and 148 | From about 0.25 to about 0.4375 |
| Width of base 112 | From about 0.75 to about 5 |
| Length of base 112 | From about 0.75 to about 1.75 |
| Thickness of base 112 | From about 0.03125 to about 3.09375 |
| Aperture 116 of base 112 | From about .25 to about 0.4375 |

It will be appreciated, however, that the pipe clamp 110 may be any dimensions suited for the application and conditions at the site where in use. The dimensions, such as length, width and height, may be stamped or marked on the pipe clamp 110 to facilitate planning and installation. In addition, the dimensions of the pipe that the pipe clamp 110 is designed to carry may be marked or stamped on the pipe clamp.

Figure 8:
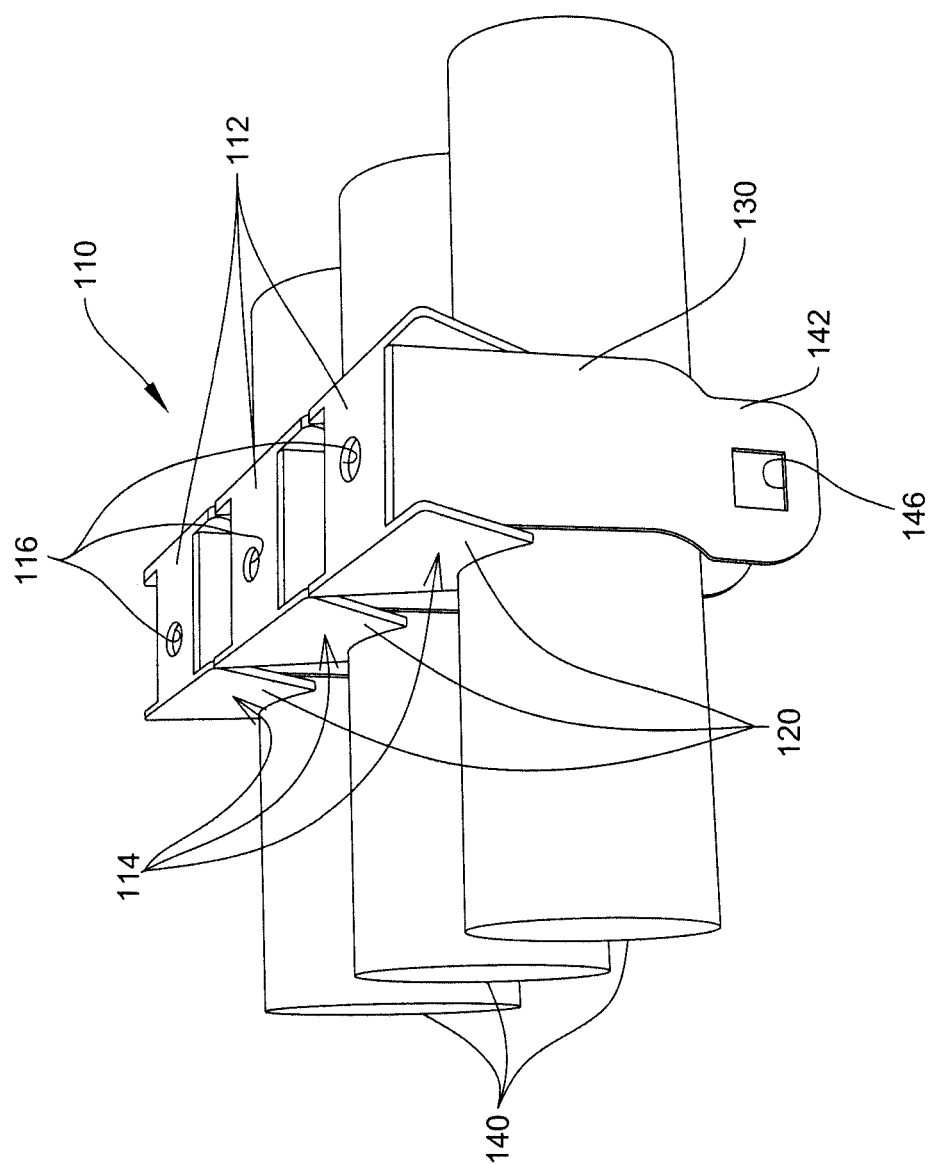
FIG. 8 shows an exemplar of the pipe clamp of the present invention employed in an installation comprising multiple parallel runs of pipe.

One advantage of having a uniform width of the seat 114 or a uniform width of the bottom portion of the load bearing member 120 and 122 is that the pipe clamp 110 may be used in applications where multiple runs of pipe are installed. As shown in FIG. 8, some industrial installations require multiple, parallel runs of pipe in a pre-defined space. Some industrial applications require hundreds of runs of pipe, particularly in electrical applications. Using the pipe clamp 110 of the present invention, the load bearing member 114 defines the width of the pipe clamp, which may be marked or stamped on the clamp. Based on this width, the electrician may calculate in advance how far apart the runs of pipe should be for the particular project in the pre-defined space to ensure accuracy and neatness. Prior art clamps 10 lack this feature and do not enable the workman to plan the execution of a project in this way. Other dimensions of the pipe clamp 110 may also be marked or stamped on the pipe clamp.

The present invention also comprises a method of installing a pipe horizontally or vertically to a structural support. The method of installing a pipe incorporates the foregoing description of the pipe clamp 110 of the present invention. The method comprises the steps of providing a load bearing seat adapted to receive the pipe in either a vertical or horizontal position. The load bearing seat is contiguous with a base. The method may further comprise the step of providing side support for the pipe, the side support extending at an oblique angle with respect to the base support and substantially surrounding the circumference or the perimeter of the pipe. The method may further comprise the step of securing the side supports together and installing the pipe on the support structure. The method may further comprise the step of installing multiple pipes to a structural support and predefining the spacing of the multiple pipes prior to installation based upon the dimensions of the clamp, and in particular the load bearing members.

A method of making a clamp for supporting pipes is included and comprises the step of forming an integral cutout from a material. The method of installing a pipe incorporates the foregoing description of the pipe clamp 110 of the present invention. The cutout comprises a base and a seat for receiving a pipe, the seat comprising at least two load bearing members, and at least two side support members. The dimensions of cutout range in length from about 1.75 to about 20 inches and in width, as measured across the seat 114, from about 2.5 inches to about 8 inches.

It now will be appreciated that the present invention presents a pipe clamp that fully engages and supports the pipe when installed in either vertical or horizontal configurations on a vertical support surface, and in a horizontal configuration on a floor. The pipe clamp of the present invention comprises a rigid, one-piece clamp and forms a seat for receiving the pipe, thereby enabling the clamp to grip the pipe circumferentially and providing rigidity, toughness and strength to resist slippage and crushing The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A clamp for supporting pipe, the clamp comprising:
a base having a first end and a second end;
a seat for receiving a pipe, the seat comprising a load bearing member adapted to receive the pipe and contiguous with the base; and
at least two side support members adapted to receive the pipe, the at least two side support members extending from the base at an oblique angle with respect to the base, wherein at least one of the two side support extends from the first end of the base and wherein another of the at least two side support members extends from the second end of the base;
wherein the clamp is formed from a single piece of material and wherein the load bearing member comprises a bottom and a top and wherein the bottom of the load bearing member is wider than the top of the load bearing member to distribute the weight of the load imparted by the pipe.

2. The clamp of claim 1 wherein each of the at least two support members comprises an upwardly extending arm for receiving the pipe and wherein each upwardly extending arm forms an aperture for receiving a fastener to secure the pipe within the clamp.

3. The clamp of claim 2 wherein each of the upwardly extending arms is curved for receiving a tubular pipe.

4. The clamp of claim 1 wherein the clamp comprises an integral unit.

5. The clamp of claim 1 wherein the clamp is made from materials selected from one of the group consisting of chrome, galvanized steel, steel chrome-plated, steel with nickel/silicon carbide composite coating, brass, brass-chrome plated, zinc plated steel, brass with nickel/silicon carbide composite, stainless steel, stainless chrome-plated, stainless with nickel/silicon carbide composite coating, carbonitrided steel, nickel carbide plated steel, tempered steel, copper coated steel, aluminum, polymers, including polyvinylchloride, polyurethane, polyamide and polyesters, enhanced with glass or carbon composites, and alloys and mixtures of the foregoing.

6. The clamp of claim 1 wherein the seat forms a saddle shape for receiving the pipe.

7. The clamp of claim 1 wherein the base and the seat create a levered support for the pipe when the clamp is installed on a structural support.

8. The clamp of claim 1 wherein the width of the top of the load bearing member ranges from about 0.5 inches to about 5 inches and the width of the bottom of the load bearing member ranges from about 1.125 inches to about 7.5 inches.

9. The clamp of claim 1 wherein the load bearing member has a height that ranges from about 0.5 inches to about 2 inches.

\* \* \* \* \*